United States Patent
Boyaci et al.

(10) Patent No.: US 8,626,237 B2
(45) Date of Patent: Jan. 7, 2014

(54) INTEGRATING A CELLULAR PHONE WITH A SPEECH-ENABLED SOFTPHONE

(75) Inventors: Omer Boyaci, Ahmetpasa (TR); Parameshwaran Krishnan, Basking Ridge, NJ (US); Anjur Sundaresan Krishnakumar, Rocky Hill, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 486 days.

(21) Appl. No.: 12/207,230

(22) Filed: Sep. 9, 2008

(65) Prior Publication Data

US 2009/0082062 A1 Mar. 26, 2009

Related U.S. Application Data

(60) Provisional application No. 60/974,817, filed on Sep. 24, 2007.

(51) Int. Cl.
*H04B 1/38* (2006.01)
*H04B 7/00* (2006.01)

(52) U.S. Cl.
USPC ....... 455/557; 455/41.3; 455/420; 455/575.2; 455/563; 455/41.2

(58) Field of Classification Search
None
See application file for complete search history.

(56) References Cited

U.S. PATENT DOCUMENTS

| | | | |
|---|---|---|---|
| 7,315,521 B2 * | 1/2008 | Gadamsetty et al. | 370/311 |
| 2002/0077095 A1 | 6/2002 | Fu et al. | |
| 2004/0063452 A1 * | 4/2004 | Tomoda | 455/519 |
| 2004/0147282 A1 * | 7/2004 | Nakasato et al. | 455/552.1 |
| 2005/0014487 A1 | 1/2005 | Kobayashi et al. | |
| 2005/0272415 A1 * | 12/2005 | McConnell et al. | 455/418 |

(Continued)

FOREIGN PATENT DOCUMENTS

WO WO 0137262 A1 5/2001

OTHER PUBLICATIONS

Gkeli, Maria, "EP Application No. 08253043.7 Search Report", Feb. 9, 2009, Publisher: EPO, Published in: EP.

(Continued)

*Primary Examiner* — Yuwen Pan
*Assistant Examiner* — Fanghwa Wang
(74) *Attorney, Agent, or Firm* — John Maldjian, Esq.; Alexander D. Walter, Esq.; Kacvinsky Daisak PLLC (57) ABSTRACT

A method is disclosed that enables access to the paired combination of a personal computer and cellular telephone, the access being provided through voice commands from a Bluetooth headset or other type of wireless headset. Through the headset, a user is able to invoke a speech-recognition engine during a call in progress that involves the cell phone with which the personal computer has been paired. The set of phrases that can be recognized by the engine, which is resident at the personal computer, are based on the current call-processing state of the call that is being handled by the paired cell phone. Some of the phrases correspond to commands to retrieve one or more entries from a database, such as one stored at the cell phone. One or more of the commands can be for controlling the cell phone or a softphone application that executes at the personal computer.

16 Claims, 5 Drawing Sheets

(56) References Cited

U.S. PATENT DOCUMENTS

| | | |
|---|---|---|
| 2006/0019713 A1* | 1/2006 | Rokusek et al. ............... 455/563 |
| 2007/0004473 A1* | 1/2007 | Clark et al. ................. 455/575.2 |
| 2008/0037727 A1* | 2/2008 | Sivertsen et al. ........... 379/88.13 |
| 2008/0043718 A1* | 2/2008 | Chu .............................. 370/352 |
| 2008/0261603 A1* | 10/2008 | Sever et al. ................... 455/445 |

OTHER PUBLICATIONS

"EP Application No. 08253043.7-2414 / 2040444 Office Action Sep. 29, 2009", , Publisher: EPO, Published in: EP.

Avaya Inc., Korean Patent Application No. 2008-0093570, Office Action dated Jan. 14, 2013, 2 pages.

* cited by examiner

INTEGRATING A CELLULAR PHONE WITH A SPEECH-ENABLED SOFTPHONE

CROSS REFERENCE TO RELATED APPLICATIONS

The underlying concepts, but not necessarily the language, of the following case are incorporated by reference:

U.S. Patent Application Ser. No. 60/974,817, filed Sep. 24, 2007. If there are any contradictions or inconsistencies in language between the present application and the case that has been incorporated by reference that might affect the interpretation of the claims in the present application, the claims in this application should be interpreted to be consistent with the language in this application.

FIELD OF THE INVENTION

The present invention relates to telecommunications in general, and, more particularly, to integrating a cellular telephone with a speech-enabled softphone.

BACKGROUND OF THE INVENTION

A cellular telephone is a portable communication device that is used extensively by business enterprise personnel. As a portal of telephony communication, the cellular telephone (or "cell phone") provides mobile communication to its user, thereby enabling the user to be reached most anywhere and at any time.

A personal computer is another communication device that is used extensively by business enterprise personnel. As a portal of data communication, enabling exchanges of email and instant messaging, the computer can also be furnished with a "softphone" software application that enables the computer to act as a telephone. A notebook computer, or other type of portable computer, further enhances its user's ability to communicate with others most anywhere and at any time.

A wireless headset, such as a Bluetooth headset, can be paired with a communication device such as a cellular telephone or a personal computer. For example, when paired with a cellular telephone, the headset is able to exchange audio signals with the telephone, enabling the headset user to converse with the other party on a call via the headset. Additionally, the headset comprises control buttons that enable the user to answer or hang up on a call, or to adjust the volume of the audio signal being provided to the headset user.

Given the extensive use of cell phones, softphones on personal computers, and wireless headsets, integrating at least some aspects of all three devices would be desirable.

SUMMARY OF THE INVENTION

The present invention enables access to the paired combination of a personal computer and cellular telephone, the access being provided through voice commands from a Bluetooth headset or other type of wireless headset. In accordance with the illustrative embodiment, voice commands given through the headset enable a user to perform a variety of call interactions in a hands-free manner, on a call in progress that is being handled by the cell phone or by a softphone application that executes at the personal computer. A speech-recognition engine that recognizes the voice commands is resident at the personal computer. The engine is invoked on demand, a benefit of which is that the speech recognition, as a result, can be made targeted and efficient. The set of phrases that can be recognized by the engine are based on the current call-processing state of a call, such as one that is being handled by the paired cell phone. Some of the phrases correspond to commands to retrieve one or more entries from a database, such as a call log or a phone book database, which is either stored at the cell phone or at a server in a network.

The personal computer of the illustrative embodiment features a personal area network (PAN) interface that the computer uses to communicate directly with each of the cell phone and headset. The PAN itself is a shared computer network that is used to enable the direct communication of the personal computer with each of the other two devices. The coverage area of the PAN is considered short-range, in that it is typically only a few meters across.

A key difference between the network configuration of the illustrative embodiment and some network configurations in the prior art is that the network configuration of the illustrative embodiment consists of a headset paired with a personal computer and the personal computer paired with a cell phone, but not the headset paired with the cell phone. The network configuration of the illustrative embodiment is significant, in that it enables the personal computer to essentially act as an intermediary between the headset and cell phone and, as a result, provides value-added features such as on-demand speech recognition and execution of recognized voice commands. And the personal computer is able to interpret one or more control signals arriving from the headset as different types of stimuli or indications, in some embodiments based on the call-processing state of a call being handled by the cell phone or the softphone application.

In some embodiments, the personal computer is able to receive and recognize a series of control signals from the headset. A predetermined combination of control signals can be used as a pass phrase that allows the headset user subsequent access to the softphone application, such as to issue voice commands to be recognized by the softphone. If the received series of control signals matches the predetermined combination for that user at that personal computer, the computer grants the user subsequent access to the softphone.

The illustrative embodiment features a softphone terminal at a personal computer that is paired with a cellular telephone. However, it will be clear to those skilled in the art, after reading this specification, how to make and use alternative embodiments that feature another type of terminal that is capable of performing the tasks described herein and a second telecommunications device to be controlled by voice commands that are recognized by the terminal. Furthermore, although the PAN of the illustrative embodiment operates in conformity with the Bluetooth specification, it will be clear to those skilled in the art how to make and use alternative embodiments in which the PAN operates in conformity with other sets of protocols.

The illustrative embodiment of the present invention comprises a method comprising: establishing i) a first connection via a personal area network between a first telecommunications device and a headset device and ii) a second connection between the first telecommunications device and a second telecommunications device; receiving, at the first telecommunications device, an indication that the second telecommunications device is handling a first telephone call; receiving, at the first telecommunications device from the headset device, i) a control signal generated by the headset device as the result of an actuation of an answer/end-call button at the headset device, followed by ii) a voice signal that conveys an utterance made by a user of the headset device; and invoking, at the first telecommunications device, a speech-recognition function on the utterance received, based on the receiving of i) the indication and ii) the control signal.

DETAILED DESCRIPTION

Figure 1:
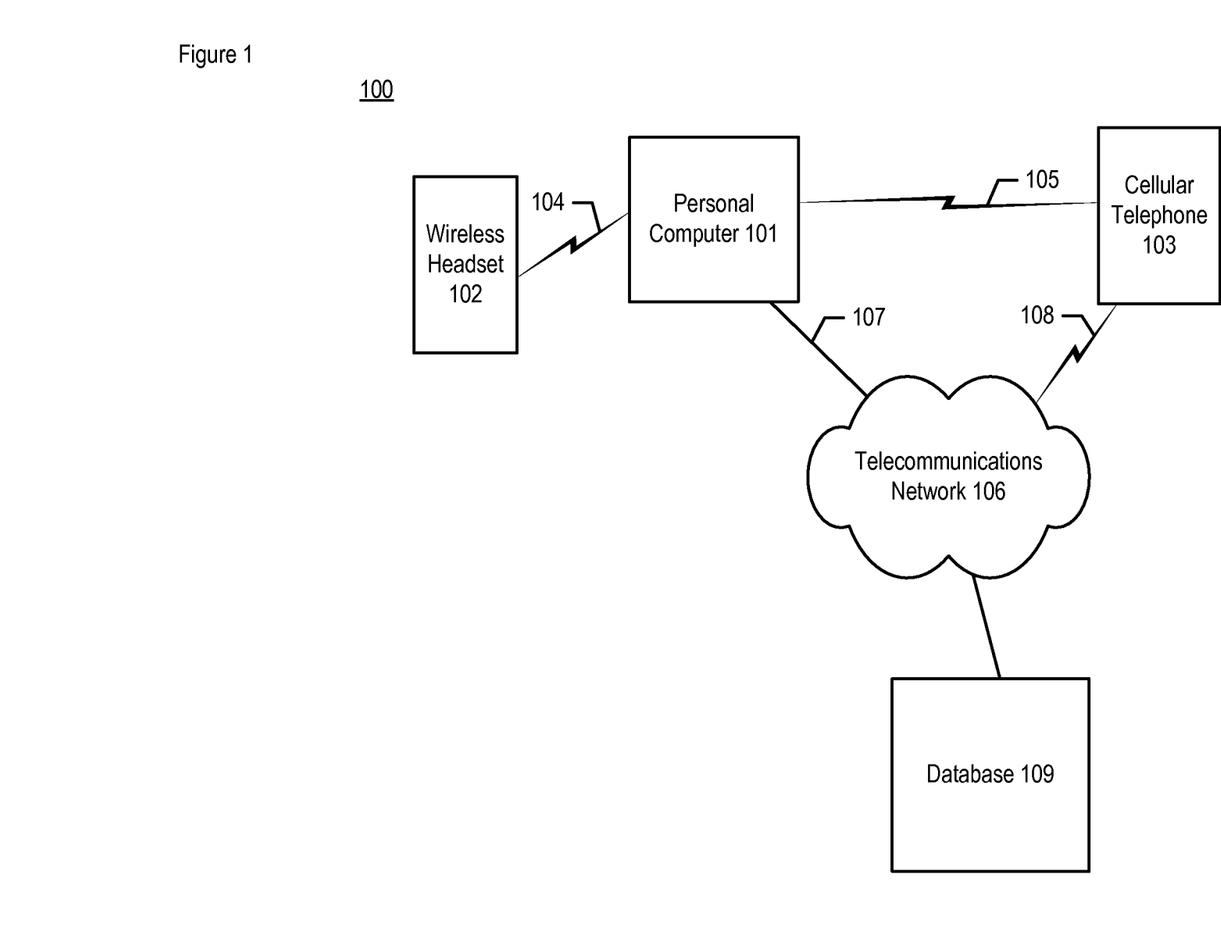
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises personal computer 101, wireless headset 102, cellular telephone 103, telecommunications network 106, and database 109, interconnected as shown.

Personal computer 101 is computer that is intended to be operated directly by an end user, such as a desktop computer, a laptop computer, or a tablet computer. In accordance with the illustrative embodiment, computer 101 provides the functionality of a softphone terminal, in that it executes a softphone application as is known in the art. A softphone terminal is the combination of a general-purpose, personal computer and a softphone software application that runs on the computer. The resident softphone application enables computer 101's user to make and receive telephone calls through the computer.

It will be clear to those skilled in the art, after reading this specification, how to make and use alternative embodiments of the present invention in which computer 101 is another type of device that is capable of executing software or firmware that embodies at least some of the tasks of the illustrative embodiment. For example, computer 101 can instead be a SIP- or IP-capable deskset, an automobile-based component that is Bluetooth-capable, or a cellular phone.

Figure 2:
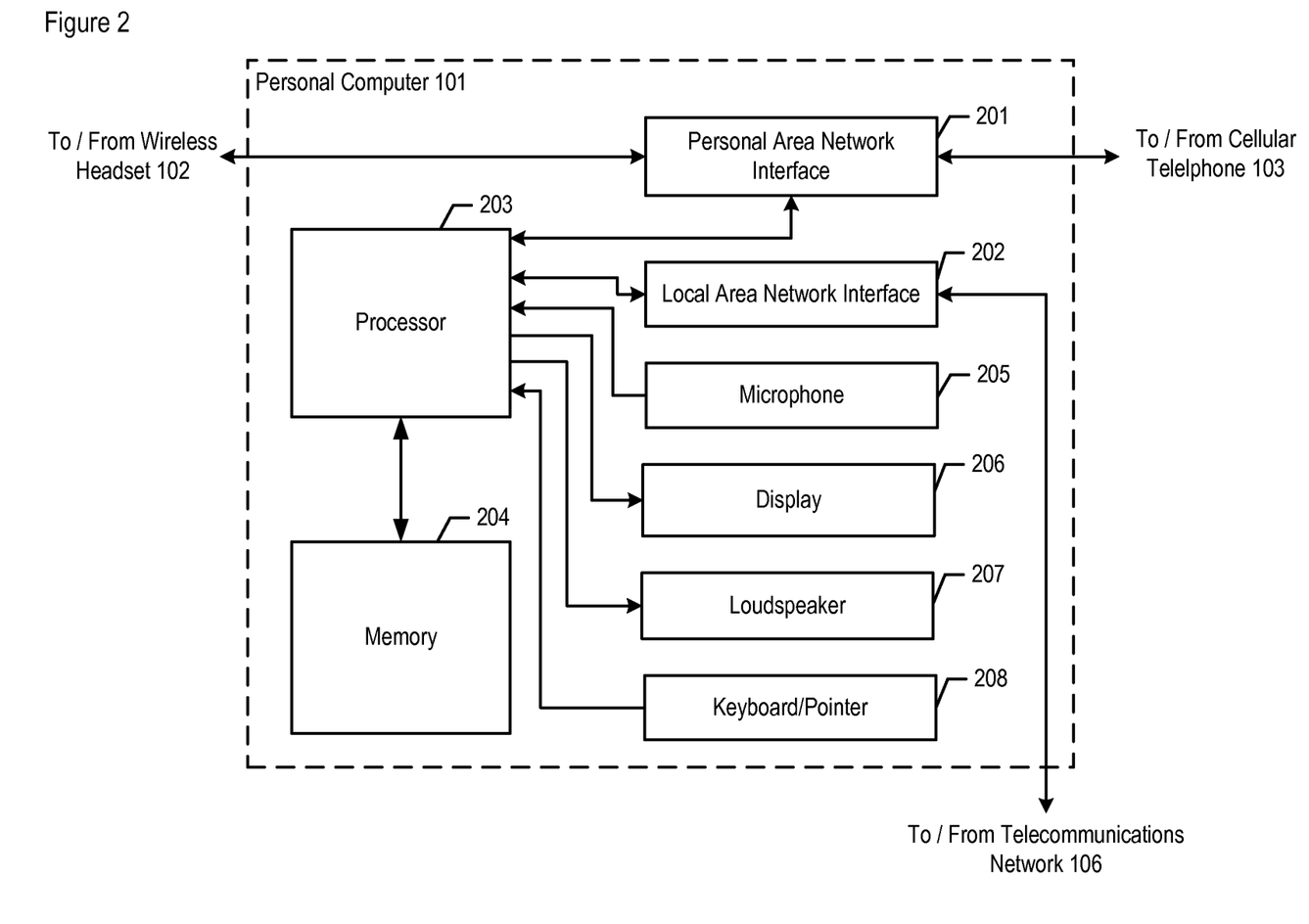
FIG. 2 is a block diagram of the salient components of personal computer 101 within system 100.

The salient components of computer 101, described below and with respect to FIG. 2, are together capable of performing the tasks of the illustrative embodiment. The salient tasks that are performed by computer 101 are described below and with respect to FIGS. 3 through 5.

Wireless headset 102 is a device that is capable of exchanging control signals and voice signals with another wireless-capable device, such as personal computer 101. In some embodiments, headset 102 comprises one or more user-actuated buttons, such as an "answer/end-call" button (or "main" button), an "increase volume" button, and a "decrease volume" button. Each button, when actuated, produces a different control signal that is transmitted to the other wireless-capable device, in this case personal computer 101. Additionally, during a call that involves either i) the softphone application of computer 101 or ii) cellular telephone 103, headset 102 transmits its user's voice to computer 101 and receives the other party's voice from computer 101.

Cellular telephone 103 is a telecommunications device that is capable of handling a telephone call for its user via a cellular-based network. Telephone 103 is able to call, or to be called by, another device within telecommunications system 100. For example, a calling party might attempt to call telephone 103 by dialing a telephone number that routes to telephone 103, whereupon telephone 103 receives an incoming call from the calling party.

In accordance with the illustrative embodiment, telephone 103 is a cellular telephone. However, it will be clear to those skilled in the art, after reading this specification, how to make and use embodiments of the present invention in which telephone 103 is a different type of device than a cell phone.

Personal computer 101 is able to communicate directly with wireless headset 102 and cellular telephone 103 via a personal area network. Each pairing of computer 101 with headset 102 and computer 101 with telephone 103 is established separately within the personal area network, wherein the two pairings are depicted as connections 104 and 105, respectively. As is known in the art, a personal area network (PAN) is a computer network used for communication among computer devices and telecommunications devices that are near a person, such as devices 101 through 103. The coverage area of a PAN is considered short-range, in that it is typically only a few meters across. In accordance with the illustrative embodiment, the PAN used by devices 101 and 102 to communicate directly with each other, as well as by devices 101 and 103, operates in accordance with the Bluetooth specification. Additionally, the direct communications within each pairing of devices is conducted over a secure, globally unlicensed Industrial, Scientific, and Medical (ISM) radio-frequency bandwidth in the 2.4 GHz range.

In some alternative embodiments, the devices within each pairing (i.e., devices 101 and 102, devices 101 and 103) communicate with each other via a radio-frequency bandwidth and/or type of wireless PAN that is different from that in the illustrative embodiment, such as one based on the IrDA, UWB, or ZigBee specification. In some other alternative embodiments, the paired devices communicate directly via a wired PAN, such as one based on USB or FireWire.

Telecommunications network 106 provides the connectivity among various telecommunications terminals in system 100 and enables the transport and control of communications signals between two or more terminals per call. The communications signals convey bitstreams of encoded media such as audio, video, and so forth. To this end, network 106 comprises one or more interconnected data-processing systems such as switches, servers, routers, and gateways, as are well-known in the art.

In accordance with the illustrative embodiment, network 106 comprises a variety of subnetworks for the purpose of providing connectivity to their constituent devices. For example, network 106 comprises a local area network (LAN) for the purpose of providing connectivity to computer 101. In accordance with the illustrative embodiment, computer 101 connects to the LAN via wired Ethernet connection 107, while in some alternative embodiments, the connection to the LAN is wireless. Additionally, network 106 comprises a cellular network for the purpose of providing connectivity to telephone 103. In accordance with the illustrative embodiment, telephone 103 connects to the cellular network via radio-frequency link 108, which is provided by whichever radio base station in the network is assigned to handle telephone 103 at any particular moment.

Database 109 comprises a server that stores information such as call logs and telephone directories (i.e., "phone books"). In situations where cellular telephone 103 does not support call log or phone book retrieval through connection 105, computer 101 is able to retrieve such information from database 109, such as via web access.

FIG. 2 is a block diagram of the salient components of personal computer 101 in accordance with the illustrative embodiment of the present invention. The depicted components are interconnected as shown. In accordance with the illustrative embodiment, computer 101 comprises:

i. personal area network interface 201,
    ii. local area network interface 202,
    iii. processor 203,
    iv. memory 204,
    V. microphone 205,
    vi. display 206,
    vii. loudspeaker 207, and
    viii. keyboard/pointer 208.

It will be clear to those skilled in the art, after reading this disclosure, how to make and use alternative embodiments of the present invention in which telecommunications computer 101 comprises any subcombination of the components listed above.

Personal area network (PAN) interface 201 enables computer 101 to receive signals directly from and transmit signals directly to headset 102 and telephone 103, in well-known fashion. To do so, interface 201 comprises one or more wireless transceivers, each transceiver being either internal to computer 101 or a peripheral device that is added to the computer (e.g., via USB interface, etc.). In accordance with the illustrative embodiment, computer 101 receives and transmits control signals via PAN interface 201 in well-known fashion. For example, PAN interface 201 can receive control signals from headset 102 and a notification from telephone 103 of an incoming call. Computer 101 receives and transmits voice signals as well via PAN interface 201 to either device with which computer 101 is paired (i.e., headset 102 and telephone 103). In any event, it will be clear to those skilled in the art how to make and user PAN interface 201.

Local area network (LAN) interface 202 enables computer 101 to receive signals from and transmit signals to one or more devices within telecommunications network 106, as well as database 109, in well-known fashion. In accordance with the illustrative embodiment, computer 101 receives and transmits control signals via LAN interface 202 in well-known fashion. Additionally, LAN interface 202 receives and transmits media waveform signals in well-known fashion, such as audio signals that are encoded via the ITU G.729 standard (or other standard) and represented in Voice over Internet Protocol (VoIP) packet streams of data. As those who are skilled in the art will appreciate, in some alternative embodiments computer 101 receives and transmits media waveform signals that are encoded and/or represented in a different format. It will be clear to those skilled in the art how to make and user LAN interface 202.

Processor 203 is a general-purpose processor that is capable of receiving information from PAN interface 201, LAN interface 202, microphone 205, and keyboard/pointer 208, of executing instructions stored in memory 204 such as those that correspond to some or all of the tasks of the illustrative embodiment, of reading data from and writing data into memory 204, and of transmitting information to PAN interface 201 and LAN interface 202. Additionally, processor 203 is able to provide signals to display 206 and loudspeaker 207. Processor 203 is also able to perform voice recognition on signals received from microphone 205 and speech-to-text conversion on signals received from PAN interface 201 or LAN interface 202.

In some alternative embodiments of the present invention, processor 203 might be a special-purpose processor. In some other alternative embodiments, the functionality performed by processor 203 might be divided up among multiple processors (e.g., one for speech recognition, another for general processing, etc.).

Memory 204 stores the instructions and data used by processor 203, in well-known fashion. Memory 204 can be any combination of dynamic random-access memory (RAM), flash memory, disk drive memory, and so forth. In accordance with the illustrative embodiment, memory 204 is further capable of storing database entries received from either telephone 103 or database 109.

Microphone 205 is a transducer that is able to receive acoustic signals and to convert them to electrical signals for transmission and/or storage. It will be clear to those skilled in the art how to make and use microphone 205.

Display 206 is a device that is able to present the computer's user with a visual representation of information, including database entries received from either telephone 103 or database 109. It will be clear to those skilled on the art how to make and use display 206.

Loudspeaker 207 is an electro-acoustic transducer that is able to present the computer's user with an audible representation of information. As those who are skilled in the art will appreciate, in some alternative embodiments of computer 101, loudspeaker 207 can instead be a type of electro-acoustic transducer other than a loudspeaker, such as an earpiece. In any event, it will be clear to those skilled on the art how to make and use loudspeaker 207.

Keyboard/pointer 208 is a keyboard-based and/or pointer-based device that is able to accept user input signals and to convert them to electrical signals for the purpose of controlling other elements of computer 101. It will be clear to those skilled in the art how to make and use keyboard/pointer 208.

In accordance with the illustrative embodiment, processor 203 of computer 101 performs the tasks described below and with respect to FIGS. 3 through 5. As those who are skilled in the art will appreciate, in some alternative embodiments, two or more components within computer 101 can perform different subsets of the described tasks.

Figure 3:
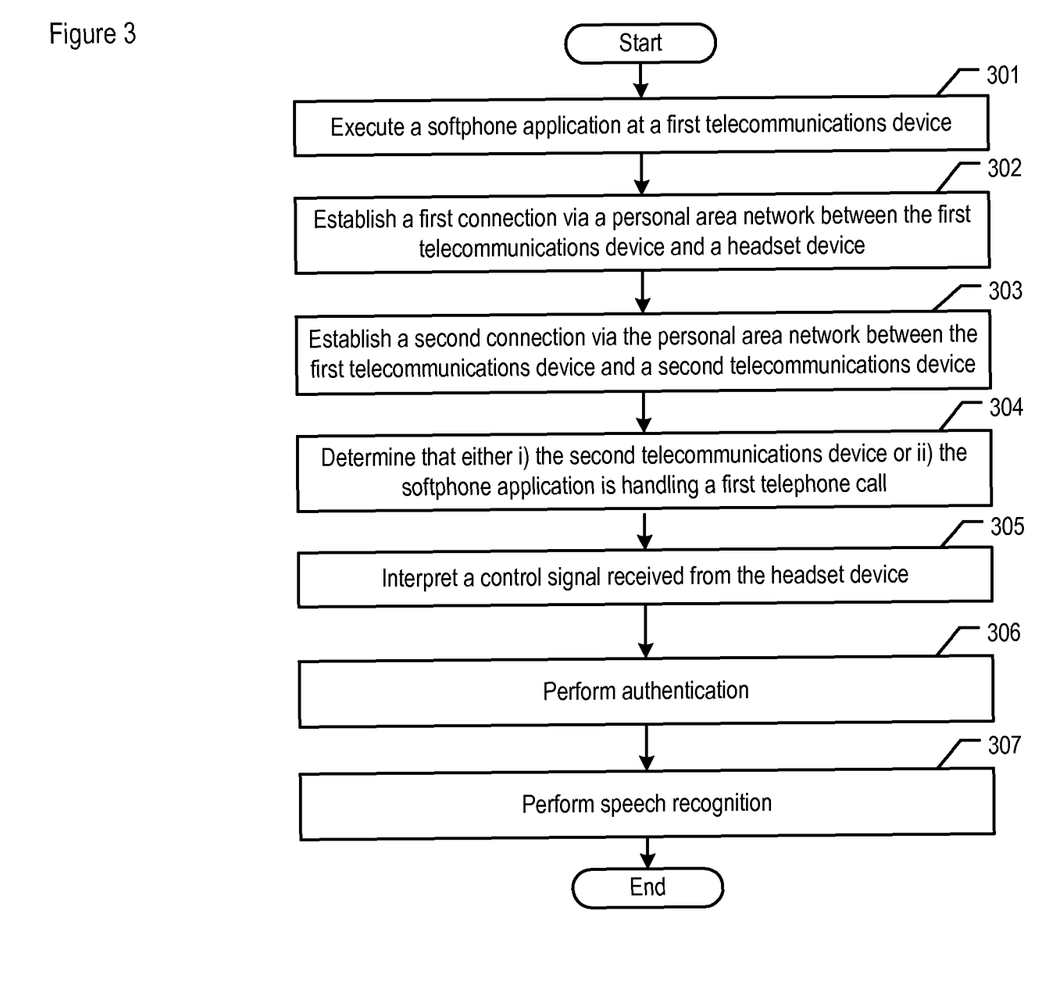
FIG. 3 depicts a flowchart of the salient tasks associated with the operation of the illustrative embodiment of the present invention.
Figure 4:
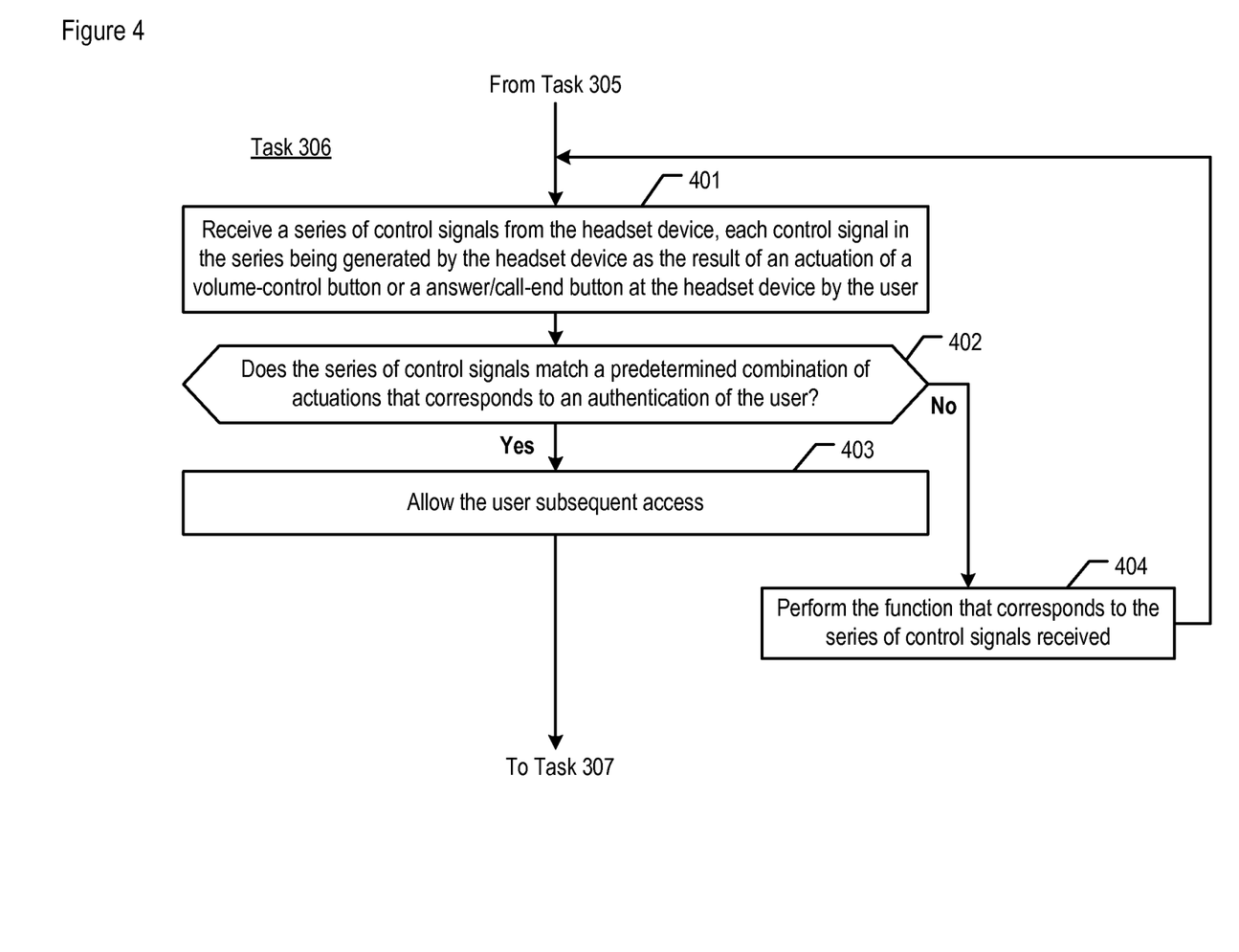
FIG. 4 depicts a flowchart of the salient tasks associated with the performance of task 306 of FIG. 3.
Figure 5:
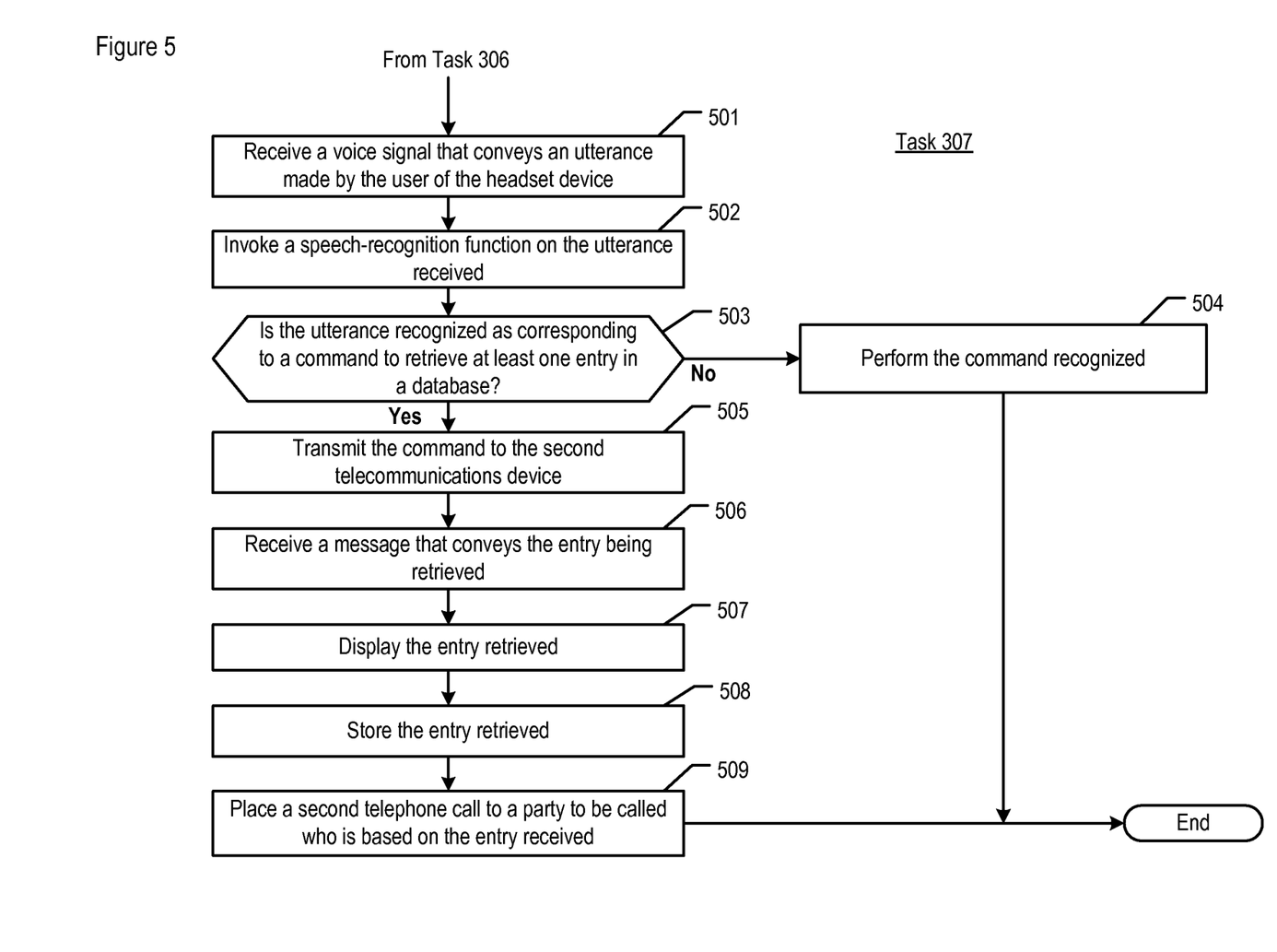
FIG. 5 depicts a flowchart of the salient tasks associated with the performance of task 307 of FIG. 3.

FIGS. 3 through 5 depict flowcharts of the salient tasks associated with the operation of the illustrative embodiment of the present invention. As those who are skilled in the art will appreciate, in some alternative embodiments, only a subset of the depicted tasks is performed. In some other alternative embodiments, at least some of the tasks are performed simultaneously or in a different order from that depicted.

In the example that follows, computer 101's user, headset 102's user, and telephone 103's user are the same person. Computer 101 is a notebook computer, which runs a softphone application, and telephone 103 is a cellular telephone. The user of the three devices has situated headset 102 and telephone 103 to be within close enough proximity to computer 101, so that the devices are able to communicate directly with each other via a personal area network. Also, the personal area network has been initialized, so that devices 101 and 102 are able to exchange information directly with each other, as are devices 101 and 103. In accordance with the illustrative embodiment, headset 102 and telephone 103 do not directly communicate with each other, for they are each paired instead with computer 101.

Referring now to FIG. 3, at task 301, computer 101 executes a softphone application in well-known fashion. Going forward from this event, the softphone will be at least able to handle incoming and outgoing telephone calls via connection 107, based on input from computer 101's user. And if it is paired with cellular telephone 103, the softphone is also able to handle calls via connection 105, as described below.

At task 302, computer 101 establishes a first connection via a personal area network (PAN) between the computer (i.e., a "first telecommunications device") and wireless headset 102

(i.e., a "headset device"), in well-known fashion. It will be clear to those skilled in the art how devices "pair" with each other within a PAN.

At task 303, computer 101 establishes a second connection via a personal area network between the computer and cellular telephone 103 (i.e., a "second telecommunications device"). In some alternative embodiments, computer 101 does not establish the second connection because the computer will not be controlling or exchanging signals directly with a separate telephone and will instead have access to telephony through the computer's softphone application only.

At task 304, computer 101 determines that a telephone call is being handled, either by telephone 103 or by the softphone application. In a first illustrative example, computer 101 determines that telephone 103 is handling a telephone call. The determination is based on computer 101 receiving, or otherwise deriving based on one or more signals from headset 102 and/or telephone 103, an indication as to the specific call-processing state that the call is in, as described below and with respect to task 504. As described below, the set of commands that computer 101 can recognize and act upon depends on the current call-processing state.

In one set of embodiments, the indication might signify that an incoming call to telephone 103 has been answered by its user. In this first case, the indication might comprise receiving both i) an incoming call notification from telephone 103, followed by ii) a control signal from headset 102; the control signal has been generated by the headset as the result of an actuation of the answer/end-call button at the headset and, in this first case, is interpreted as stimulus to answer the call. In another set of embodiments, the indication might signify that an outgoing call from telephone 103 has been answered by the far-end party. In this second case, the indication is the result of receiving a call-answer indication from telephone 103. As those who are skilled in the art will appreciate, the indication that telephone 103 is handling a call might be based on other combinations of signals than those described.

In a second illustrative example, computer 101 determines instead that its softphone application is handling a telephone call with a far-end party (i.e., via connection 107). Computer 101 determines this independently of whether it is paired with telephone 103 or not. The determination is based on computer 101 receiving—or otherwise deriving based on one or more signals from headset 102 and/or the telephony equipment of the far-end party—an indication as to the specific call-processing state that the call is in, as described below and with respect to task 504. As described below, the set of commands that computer 101 can recognize and act upon depends on the current call-processing state.

At task 305, computer 101 receives and interprets a control signal from headset 102. The control signal is the result of an actuation of one of the buttons at the headset. In accordance with the illustrative embodiment, the control signal is specifically the result of an actuation of the answer/end-call button. In fact, each time a control signal is received from the headset—and there can be multiple control signals received throughout an interval associated with a call—computer 101 interprets the receiving of the control signal as i) a stimulus to initiate an outgoing call, ii) a stimulus to answer an incoming call, iii) a stimulus to invoke a speech-recognition function on an utterance received from headset 102, if such an utterance is received, or iv) an indication of something else. In accordance with the illustrative embodiment, the interpretation is based on the current call-processing state—that is, the call-processing state of the call at the time that the control signal is received.

At task 306, computer 101 performs authentication on the user. Task 306 is described below and with respect to FIG. 4. In some alternative embodiments, task 306 is skipped entirely.

At task 307, computer 101 performs speech recognition on an utterance made by the user, based on having received the control signal at task 305. Task 307 is described below and with respect to FIG. 5.

Although task execution is depicted as then terminating, it will be clear to those skilled in the art, after reading this specification, how to make and use embodiments in which computer 101 continues to monitor for additional control signals and performs accordingly the functions that are invoked by those control signals. Additionally, it will be clear to those skilled in the art, after reading this specification, how to make and use embodiments in which computer 101 performs at least some of the tasks described herein on subsequent incoming or outgoing calls that involve cellular telephone 103 and/or the softphone application.

FIG. 4 depicts a flowchart of the salient tasks associated with the performance of task 306. At task 401, computer 101 receives, from headset 102, a series of control signals. Each control signal in the series is generated by headset 102 as the result of an actuation of a volume-control button or an answer/end-call button at the headset by its user.

At task 402, computer 101 checks whether the series of control signals received matches a predetermined combination of actuations that corresponds to an authentication of the user at computer 101. For example, each user within an enterprise system can be assigned his or her own unique combination of actuations ahead of time, essentially to serve as a pass phrase.

If the series matches, task execution proceeds to task 403. Otherwise, task execution proceeds to task 404.

At task 403, computer 101 allows the user of headset 102 subsequent access to the softphone terminal and/or to other functionality that includes access to the speech-recognition function and voice command capability. Task execution then proceeds to task 307.

At task 404, computer 101 performs the function that corresponds to the series of control signals received, in the event that the series does not constitute an authentication of the particular user on the particular softphone terminal. Task execution then proceeds to task 401 in order to accept possible additional control signals.

FIG. 5 depicts a flowchart of the salient tasks associated with the performance of task 307. At task 501, computer 101 receives, from headset 102, a voice signal that conveys an utterance made by the user. In order to keep the far-end party from hearing the utterance, in some embodiments, computer 101 has already stopped transmitting the voice signals from headset 102 to the far-end party (i.e., through telephone 103, if involved in the call). If computer 101 has stopped the transmitting of voice signals, it has done so either as the result of i) the control signal (corresponding to the "answer/end-call" button) having been received at task 305 and subsequently performing the speech recognition at task 307 or ii) the authentication of the user having occurred at task 306.

At task 502, computer 101 invokes a speech-recognition function on the utterance received at task 501. In some embodiments, the speech-recognition function works on demand and only in response to having received the control signal from headset 102 at task 305, in contrast to the speech-recognition function being always on.

At task 503, computer 101 checks whether the utterance is recognized as corresponding to a command to retrieve at least one entry in a database stored at telephone 103. For example, the entry to be retrieved can be from a call log database or from a phone book database. If the utterance is recognized as such, task execution proceeds to task 505.

At task 504, computer 101 performs the recognized command, in the event that the command is not one to retrieve the entry in the database.

Depending on the call-processing state of the call, recognizable commands include, but are not limited to, the following phrases or equivalent phrases:
  i. "show options"—when received in any call-processing state,
  ii. "call name/number"; "redial"; "show missed [or received or dialed] calls"—when received before receiving incoming call notification (i.e., when not in a call),
  iii. "mute"; "hang up"; "volume up [or down]"; "hold"; "transfer"—when received during a call after the call has been answered.

In some embodiments, computer 101 also recognizes the phrases "answer" and "ignore" when a call is incoming, but before the call has been answered, instead of regarding the control signal itself as the answer call indication.

At task 505, computer 101 transmits the command to telephone 103 via the PAN. In accordance with the illustrative embodiment, computer 101 transmits the command by using one or more AT commands, as are well-known in the art. As those who are skilled in the art will appreciate, however, other command communications protocols can be used instead.

At task 506, computer 101 receives a message that conveys the entry being retrieved.

At task 507, computer 101 displays the received entry on display 206.

At task 508, computer 101 stores the retrieved entry in memory 204.

At task 509, computer 101 determines a party to be called, based on the received entry, and places a telephone call to the party to be called, via the softphone application.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   establishing via a personal area network i) a first connection between a first telecommunications device and a headset device, wherein the first connection is configured to support telephony, and ii) a second connection between the first telecommunications device and a second telecommunications device;
   receiving, at the first telecommunications device via the personal area network, an indication that the second telecommunications device is handling a first telephone call;
   receiving, at the first telecommunications device from the headset device, i) a control signal generated by the headset device as the result of an actuation of an answer/end-call button at the headset device, followed by ii) a voice signal that conveys an utterance made by a user of the headset device, wherein the utterance is a command directed at the second telecommunications device, and wherein the voice signal is conveyed via a pairing of the headset device to the first telecommunications device then via a pairing of the first telecommunications device to the second telecommunications device;
   invoking, at the first telecommunications device, a speech-recognition function to recognize the command in the utterance received, based on the receiving of i) the indication and ii) the control signal; and
   transmitting the command by the first telecommunications device to the second telecommunications device via the personal area network.

2. The method of claim 1 wherein the first telecommunications device communicates with the headset device and with the second telecommunications device through the personal area network, in accordance with the Bluetooth specification.

3. The method of claim 1 wherein the first telecommunications device is a personal computer and the second telecommunications device is a cellular telephone.

4. The method of claim 3 wherein the indication signifies that the first telephone call has been answered.

5. The method of claim 3 further comprising:
   recognizing the utterance as a command to retrieve at least one entry in a database stored at the second telecommunications device; and
   receiving, at the first telecommunications device, a message that conveys the at least one entry.

6. The method of claim 5 wherein the database is that of a call log.

7. The method of claim 5 wherein the database is that of a phone book.

8. The method of claim 5 wherein the transmitting of the command to the second telecommunications device occurs by using one or more AT commands.

9. The method of claim 5 further comprising executing a softphone application at the first telecommunications device.

10. The method of claim 9 further comprising:
    determining a party to be called, based on the at least one entry; and
    placing a second telephone call from the first telecommunications device to the party to be called, via the softphone application.

11. A method comprising:
    establishing a first Bluetooth connection between a first telecommunications device and a headset device, the first telecommunications device being capable of telephony and the first Bluetooth connection being capable of telephony;
    establishing a second Bluetooth connection between the first telecommunications device and a cellular telephone;
    receiving, at the first telecommunications device:
    i) a control signal from the headset device, wherein the control signal is generated by the headset device as the result of an actuation of an answer/end-call button at the headset device,
    ii) an indication that a call that is incoming at the cellular telephone, and
    iii) a voice signal from the headset device, wherein the voice signal conveys an utterance made by a user of the headset device, wherein the utterance is a command directed at the cellular telephone, and wherein the voice signal is conveyed via a pairing of the headset device to the first telecommunications device then via a pairing of the first telecommunications device to the cellular telephone;
    interpreting, at the first telecommunications device, the receiving of the control signal as being one of a plurality of possible interpretations that includes i) a stimulus to answer the call and ii) a stimulus to invoke a speech-recognition function to recognize the command in the utterance received, the particular interpretation being based on the call-processing state of the call at the time that the control signal is received; and transmitting the command to the cellular phone from the first telecommunications device via the second Bluetooth connection.

12. The method of claim 11 wherein the first telecommunications device is a cellular telephone.

13. The method of claim 11 further comprising executing a softphone application at the first telecommunications device.

14. The method of claim 13 wherein the command is for retrieving at least one entry in a first database stored at the cellular phone, and further comprising:

receiving, at the first telecommunications device, a message that conveys the at least one entry; and storing the at least one entry into a second database that is accessible by the softphone application.

15. The method of claim 14 wherein the first database is that of a call log.

16. The method of claim 14 wherein the first database is that of a phone book.

\* \* \* \* \*